US006754948B2

(12) United States Patent
Juranitch et al.

(10) Patent No.: US 6,754,948 B2
(45) Date of Patent: Jun. 29, 2004

(54) PRESS OPERATION VERIFICATION SYSTEM

(75) Inventors: James C. Juranitch, Walled Lake, MI (US); Robert D. Olschefski, Farmington, MI (US)

(73) Assignee: Veri-Tek International, Corp., Wixom, MI (US)

( * ) Notice: Subject to any disclaimer, the term of this patent is extended or adjusted under 35 U.S.C. 154(b) by 0 days.

(21) Appl. No.: 10/316,536

(22) Filed: Dec. 10, 2002

(65) Prior Publication Data

US 2003/0079338 A1 May 1, 2003

Related U.S. Application Data

(62) Division of application No. 09/298,348, filed on Apr. 23, 1999, now Pat. No. 6,490,775.

(51) Int. Cl.[7] .............................................. B23Q 17/00
(52) U.S. Cl. ........................... 29/705; 29/709; 29/714; 29/718; 29/407.05; 29/407.1; 73/865.8
(58) Field of Search ........................ 29/888.01, 888.44, 29/407.01, 407.05, 407.08, 407.09, 407.1, 705, 709, 714, 718; 73/865.8, 865.9

(56) References Cited

U.S. PATENT DOCUMENTS

| 4,569,126 A | * | 2/1986 | Weber ........................... 29/525 |
| 4,649,753 A | * | 3/1987 | Goodsmith ................. 73/865.8 |
| 5,537,734 A | * | 7/1996 | Belka et al. .................... 29/705 |
| 6,176,124 B1 | * | 1/2001 | Tachikiri .................... 73/865.9 |

FOREIGN PATENT DOCUMENTS

| JP | 358177241 A | * | 10/1983 | ................... 29/705 |
| JP | 362259632 A | * | 11/1987 | |

* cited by examiner

Primary Examiner—David P. Bryant
Assistant Examiner—Jermie E. Cozart
(74) Attorney, Agent, or Firm—Rohm & Monsanto, PLC

(57) ABSTRACT

A system for verifying the quality of a pressing operation of a press-fit part onto a receiving portion of a receiving assembly. The system is applicable to the installation of a bearing cup onto a shaft, or a valve seat into a cylinder head. A probe measures a predetermined dimension of the press-fit part to establish a first measurement value. In the case of a valve seat installed a receiving pocket of a cylinder head, a measuring probe is inserted into the receiving pocket of the cylinder head to measure its depth. The depth is recorded as a second measurement value. The valve seat is then pressed into the pocket, and the residual depth is measured to determine the distance between the outermost surface of the pressed in valve seat and the outer surface of the receiving pocket. A computation compares the depth of the pocket against the thickness of the valve seat to determine a difference which is then compared to the residual depth. During pressing, the hydraulic pressing force is maintained while an impulse force, similar to a hammer blow, is applied to the valve seats to ensure proper seating. The use of a hammer blow obviates the need for excessive hydraulic forces which may damage cylinder head castings. Also, the hydraulic pressing force is monitored over a predetermined distance of insertion of the press-fit part to determine the quality of the interference fit between the press-fit part and the receiving portion of the receiving assembly.

15 Claims, 7 Drawing Sheets

PRESS OPERATION VERIFICATION SYSTEM

CROSS-REFERENCE TO RELATED APPLICATION(S)

This application is a divisional of application U.S. Ser. No. 09/298,348 filed on Apr. 23, 1999, now U.S. Pat. No. 6,490,775 issued Dec. 10, 2002.

BACKGROUND OF THE INVENTION

1. Field of the Invention

This invention relates generally to systems for verifying quality control, and more particularly, to a system that ensures that a part or assembly is pressed to depth within a predetermined tolerance and measurement accuracy, and that determines the quality of the interference fit.

2. Description of the Related Art

In current pressing applications it is difficult or impossible to determine whether a pressed-in part has been pressed to a fully seated condition when the operation is complete. Current systems endeavor to ensure that a pressed-in part is fully seated by monitoring the press force and continuing the operation until a predetermined amount of force is applied. This predetermined amount of force is assumed to insure that the pressed part is driven to a full seating position, and that the force applied is representative of the quality of the interference fit. These assumptions, however, are not always correct. The force required to overcome the interference fit in the pressing operation oftentimes exceeds the preset force limit of this known approach. Sometimes, a particle of dirt or metal will become lodged behind the part that is being pressed, causing a false reading on the press force. Thus, the application of the full measure of the predetermined force will not always result in complete inward displacement and seating of the part desired to be pressed into place.

A second current method of verifying press quality is to measure the depth of press at the press ram head. Unfortunately due to part and casting variations this simple single-measurement system is inadequate, as it will not identify the quality of a precision pressing operation.

In the case of a valve seat in an engine head, or a bearing cup in an assembly, the normal working forces, vibration, and heat of the product will finally seat the incorrectly assembled part during the engine or component's normal working life. This form of seating action, however, will generally cause changes in the running clearances of the assembly that are critical to the product's over all life or performance In addition to the foregoing, valve seats in particular are subjected to tremendous amounts of heat from exhaust gasses. Often times, the temperature of the exhaust gas approaches the melting point of some metals. It is essential that proper seating of the valve seat within the receiving pocket be effected to promote transference of the heat to the cylinder head casting, which contains the cooling water jackets.

There is a need, therefore, for a quality monitoring system that overcomes the foregoing problems.

It is, therefore, an object of this invention to provide a system for pressing-in a press-fit part, such as a valve seat or bearing cup, into a receiving pocket in a receiving assembly, such as a cylinder head, that achieves seating of the part to a predetermined depth reliably.

It is another object of this invention to provide a system for pressing-in a press-fit part to achieve seating within predetermined tolerances without applying excessive continuous insertion force.

It is also an object of this invention to provide a self-aligning press fit ram.

It is a further object of this invention to provide a system for pressing-in a press-fit part to achieve verified seating within predetermined tolerances.

It is additionally an object of this invention to provide a system for pressing-in a press-fit part, such as a valve seat or bearing cup, into a receiving pocket in a receiving assembly, such as a cylinder head, that achieves seating of the part to a predetermined depth reliably, notwithstanding variations in dimensions of the press-fit part It is yet a further object of this invention to provide a system for pressing-in a press-fit part, such as a valve seat or bearing cup, into a receiving pocket in a receiving assembly, such as a cylinder head, that achieves seating of the part to a predetermined depth reliably, notwithstanding variations in depth of the receiving pocket.

It is also another object of this invention to provide a system for pressing-in a press-fit part into a receiving pocket in a receiving assembly wherein the insertion force is monitored.

SUMMARY OF THE INVENTION

The invention will be shown in one embodiment to be applied to pressing valve seats for an engine head. Bearing cups or any other precision pressing operation could use the same technology.

The foregoing and other objects are achieved by this invention which provides, in accordance with a first method aspect thereof, a method of verifying the quality of a pressing operation of a press-fit part onto a receiving portion of a receiving assembly. The method includes the steps of:

first measuring a predetermined dimension of the press-fit part to establish a first measurement value, directing a first measuring probe to the receiving portion of the receiving assembly onto which the press-fit part is to be pressed;

second measuring the receiving portion of the receiving assembly onto which the press-fit part is to be pressed, to establish a second measurement value, urging the press-fit part onto the receiving portion of the receiving assembly;

third measuring a portion of the receiving portion of the receiving assembly that extends beyond a predetermined surface of the press-fit part to establish a third measurement value, first comparing the third measurement value against the difference between the first and second measurement values to form a first comparison value; and second comparing the first comparison value against a predetermined comparison value to determine the quality of the pressing operation.

In one embodiment of this method aspect of the invention, the receiving portion of the receiving assembly onto which the press-fit part is to be pressed is a pocket of the receiving assembly. The pocket has a depth that is defined by the distance between outer and inner surfaces thereof. Moreover, the step of directing a first measuring probe to a receiving portion of the receiving assembly onto which the press-fit part is to be pressed includes the step of causing the first measuring probe to travel toward and communicate with the inner surface. In a further embodiment, there is further provided the step of second directing a second measuring probe to the outer surface of the pocket of the receiving assembly. The step of second measuring incorporates the step of differential measuring a difference in the respective distances traveled by the first and second measuring probes during the respective steps of first and second directing. Such differential measuring provides an indication of the depth of the pocket of the receiving assembly. In other embodiments, however, where a press-fit part is installed on a shaft, the receiving portion of the shaft is measured, in either case, the step of differential measuring incorporates the step of monitoring an electrical signal characteristic provided by a linear variable differential transformer (LVDT), or other measuring device, such as a laser.

In a further embodiment of this first method aspect of the invention, the step of urging the press-fit part into the pocket of the receiving assembly incorporates the further step of translating a ram element in communication with the press-fit part toward the pocket of the receiving assembly. Also, the step of translating a press rain element includes the further step of permitting an angular displacement of the press-fit part with respect to the pocket of the receiving assembly. In this manner, a plane of the press-fit part is made substantially parallel to a plane of the predetermined inner surface of the pocket of the receiving assembly.

In a still further embodiment of this first method aspect of the invention, the step of urging the press-fit part into the pocket of the receiving assembly includes the further step of measuring an insertion force of the press-fit part into the pocket of the receiving assembly to establish an insertion force value over a predetermined insertion distance. This monitoring of force over distance produces an advantageous indication of the quality of the interference fit between the press-fit part and the receiving portion of the receiving assembly. This is enhanced by the step of comparing the insertion force value against a predetermined insertion force value to determine whether the press-fit part is appropriately dimensioned for insertion into the pocket of the receiving assembly.

In a preferred embodiment, the step of urging the press-fit part into the pocket of the receiving assembly includes the further step of measuring an insertion force of the press-fit part into the receiving portion of the receiving assembly to establish an insertion force value over a predetermined insertion distance. The insertion force value is compared against a predetermined insertion force value to determine whether the press-fit part is appropriately dimensioned for insertion into the pocket of the receiving assembly.

In one embodiment, the insertion force is sampled first and second times to produce corresponding first and second insertion force values. These values are correlated to respectively associated installation distances at which the first and second insertion force values were measured. Then a comparison value is produced by comparing the first and second insertion force values. The comparison value, which will have a range of values, is associated with at least one predetermined installation condition. Preferably, a plurality of predetermined installation conditions associated with respective magnitude ranges of the comparison value resulting from said step of comparing. The following are examples:

If the initial and subsequent insertion forces both are below normal, then the press-fit part is too small for the receiving pocket (or too large for the receiving spindle); or If the initial and subsequent insertion forces both are greater than normal, then either the press-fit part is too large for the receiving pocket (or too small for the receiving spindle); or If the initial insertion force is normal or greater and the subsequent insertion force is low, then the receiving portion of the receiving assembly is irregularly dimensioned; or If the initial insertion force is normal and increases significantly, as though the end of the installation travel has been reached, but the installation distance is shorter than a predetermined installation distance, then debris has built up behind the press-fit part, the debris being the result of inadequate pre-installation cleaning or material having been scraped off of the receiving assembly due to the press-fit part being off-center as it is urged onto the receiving assembly In a still further embodiment, there is provided the step of continuously sampling the insertion force and the distance over which the insertion force is applied, to form an installation force versus installation distance correlation curve. The correlation curve can provide significant additional information about the quality of the installation of the press-fit part, as well as defects in the machining or preparation of the receiving assembly, which can be reported back to the production line to effect a correction. Such correction can be implemented in-process In a still further embodiment, there is provided the further step of applying a supplemental insertion force having a substantially predetermined energy and a short duration. The step of applying a supplemental insertion force includes the further step of accelerating a substantially predetermined mass to impact the press-fit part in the direction of the step of urging. This is performed during the step of urging the press-fit part into the pocket of the receiving assembly. Of course, this step is not limited in its application to the installation of a press-fit part into a pocket, but may be used during installation of a press-fit part onto a shaft In still another embodiment of this first method aspect of the invention, after performing the step of second measuring a depth of the pocket of the receiving assembly, and prior to performing the step of urging the press-fit part into the pocket of the receiving assembly, there are provided the steps of:

withdrawing the first measuring probe from the pocket of the receiving assembly; and installing the press-fit part on a temporary support arrangement.

The press-fit part, in a specific illustrative embodiment of the invention, has an annular configuration. Additionally, the temporary support arrangement includes a finger element about which is installed the press-fit part In accordance with a first apparatus aspect of the invention, an arrangement is provided for pressing a press-fit part into a receiving portion of a receiving assembly. In accordance with the invention, a first measuring arrangement measures a predetermined dimension of the press-fit part. A second measuring arrangement measures the receiving portion of the receiving assembly. The press-fit part is urged by a press drive onto the receiving portion of the receiving assembly. Additionally, an impulse drive applies an impetus of short duration to the press-fit part In one embodiment of this apparatus aspect of the invention, the receiving portion of the receiving assembly onto which the press-fit part is to be pressed is a pocket of the receiving assembly. There is further provided a holding arrangement for holding the press-fit part in position to be urged into the pocket of the receiving assembly by the press drive. Of course, in some embodiments of the invention, the press-fit part is to be pressed is to be installed on a shaft, as would be the case with a bearing.

There is additionally provided a force measuring arrangement for measuring an insertion force applied to the press-fit part by the press drive. As previously noted, the insertion force can be monitored over a distance of installation of the press-fit part, thereby providing an indication of the quality of the interference fit between the press-fit part and the receiving portion of the receiving assembly.

In a further embodiment of the invention, the second measuring arrangement includes a first probe for communicating with an inner surface of the pocket of the receiving assembly. Additionally, a second probe communicates with an outer surface of the pocket of the receiving assembly. Then, a differential measurement arrangement produces a first electrical measurement signal responsive to a difference in the displacements of the first and second probes. Thus, the depth of the pocket of the receiving assembly is measured.

In a still further embodiment of the invention, there is provided bearing arrangement interposed between the first and second probes. The bearing arrangement includes, in certain embodiments, an interference fit ball or roller bearing arrangement interposed between the first and second probes.

The first probe is arranged, in some embodiments, to communicate with the inner surface of the pocket of the receiving assembly at a plurality of locations thereon. The second probe is arranged to communicate with the outer surface of the pocket of the receiving assembly at a plurality of locations thereon.

An angular displacement arrangement is coupled, in certain embodiments, to the first probe. In this manner, the first probe is angularly displaceable with respect to an axis of translation thereof directed toward the pocket of the receiving assembly and substantially self-aligning with respect thereto. The first and second probes are arranged in certain embodiments of the invention to be axially parallel with respect to each other.

In yet another embodiment of the invention, the press drive is provided with an angular displacement drive that communicates with the press-fit part and renders same to be angularly displaceable with respect to an axis of translation thereof directed toward the pocket of the receiving assembly and substantially self-aligning with respect thereto. The angular displacement of the press drive is responsive to a radius that originates at a distal seating plane of the press-fit part.

In accordance with a further method aspect of the invention, there is provided a method of verifying the quality of a pressing operation of a press-fit part into a pocket of a receiving assembly. The method includes the steps of:

first measuring a predetermined dimension of the press-fit part to establish a first measurement value;

first directing a first measuring probe into the pocket of the receiving assembly;

second directing a second measuring probe onto an outer surface of the receiving assembly;

second measuring a depth of the pocket of the receiving assembly to establish a second measurement value by determining a differential between the steps of first and second directing;

installing the press-fit part on a temporary holding arrangement;

urging the press-fit part into the pocket of the receiving assembly;

third measuring a depth of the pocket to a predetermined surface of the press-fit part to establish a third measurement value;

first comparing the third measurement value against the difference between the first and second measurement values to form a first comparison value; and second comparing the first comparison value against a predetermined comparison value to determine the quality of the pressing operation.

In one embodiment of this further method aspect of the invention, the step of urging the press-fit part into the pocket of the receiving assembly includes the further steps of translating a ram element in communication with the press-fit part toward the pocket of the receiving assembly; and permitting an angular displacement of the ram whereby the press-fit part is self-aligning with respect to the pocket of the receiving assembly During performance of the step of urging there is provided the further step of measuring an insertion force of the press-fit part into the pocket of the receiving assembly to establish an insertion force value.

In a further embodiment, there is provided the further step of applying a supplemental insertion force having a substantially predetermined energy and a short duration. This application of a supplemental insertion force incorporates the further step of accelerating a substantially predetermined mass to impact the press-fit part in the direction of the step of urging. Most of the energy supplied to the press-fit part by the impulse of short duration is absorbed by the displacement of the press-fit part in the direction of urging.

In accordance with a further method aspect of the invention, there is provided a method of verifying the quality of a pressing operation of a press-fit part onto a receiving portion of a receiving assembly. The method includes the steps of:

urging the press-fit part by the application of an installation force for a determinable installation distance onto the receiving portion of the receiving assembly;

first measuring a first magnitude of the installation force applied to the press-fit part during said step of urging;

second measuring a first installation distance at which said step of first measuring is performed, the first installation distance being shorter than the determinable installation distance; and correlating the first force with the first installation distance.

In one embodiment of this further method aspect of the invention, there are provided the steps of:

third measuring a second magnitude of the installation force applied to the press-fit part during said step of urging;

fourth measuring a second installation distance at which said step of third measuring is performed, the second installation distance being shorter than the determinable installation distance;

correlating the second force with the second installation distance; and comparing the first and second installation forces.

A plurality of installation conditions are associated with respective comparison values that result from the step of comparing. As previously noted, and by way of example, the presence of a non-uniform receiving portion condition is determined in response to a comparison value that corresponds to differences between the first and second installation forces.

In a further embodiment, there are further provided the steps of:

fifth measuring a final installation force applied to the press-fit part during the step of urging, the final installation force being greater than the second magnitude of the installation force; and sixth measuring a final installation distance, the final installation distance being determined in response to the installation force increasing in magnitude to the magnitude of the final installation force without corresponding progress of the press-fit part onto the receiving assembly.

Of course, the final installation distance is compared to the determinable installation distance to determine whether the press-fit part has been inserted to the necessary extent. A fault condition is issued if the final installation distance IS shorter than the determinable installation distance.

In a highly advantageous embodiment of the invention, there is further provided the step of continuously sampling the installation force and the distance, to form an installation force versus installation distance correlation curve.

As previously noted, the press-fit part is subjected to a supplemental insertion force having a substantially predetermined energy and a short duration. The supplemental insertion force incorporates the further step of accelerating a substantially predetermined mass to impact the press-fit part in the direction of the step of urging. Most of the energy supplied to the press-fit part by the impulse of short duration is absorbed by the displacement of the press-fit part in the direction of urging.

In accordance with a further embodiment of this method aspect the invention, there are further provided the steps of first measuring a predetermined dimension of the press-fit part to establish a press-fit part measurement value;

second measuring the receiving portion of the receiving assembly onto which the press-fit part is to be pressed, to establish a receiving portion distance measurement value;

third measuring a portion of the receiving portion of the receiving assembly that extends beyond a predetermined surface of the press-fit part to establish a residual distance measurement value; and first comparing the residual distance measurement value against a determined difference value corresponding to the difference between the press-fit part and the receiving portion measurement values.

BRIEF DESCRIPTION OF THE DRAWING

Comprehension of the invention is facilitated by reading the following detailed description, in conjunction with the annexed drawing, in which.

DETAILED DESCRIPTION

Figure 1:
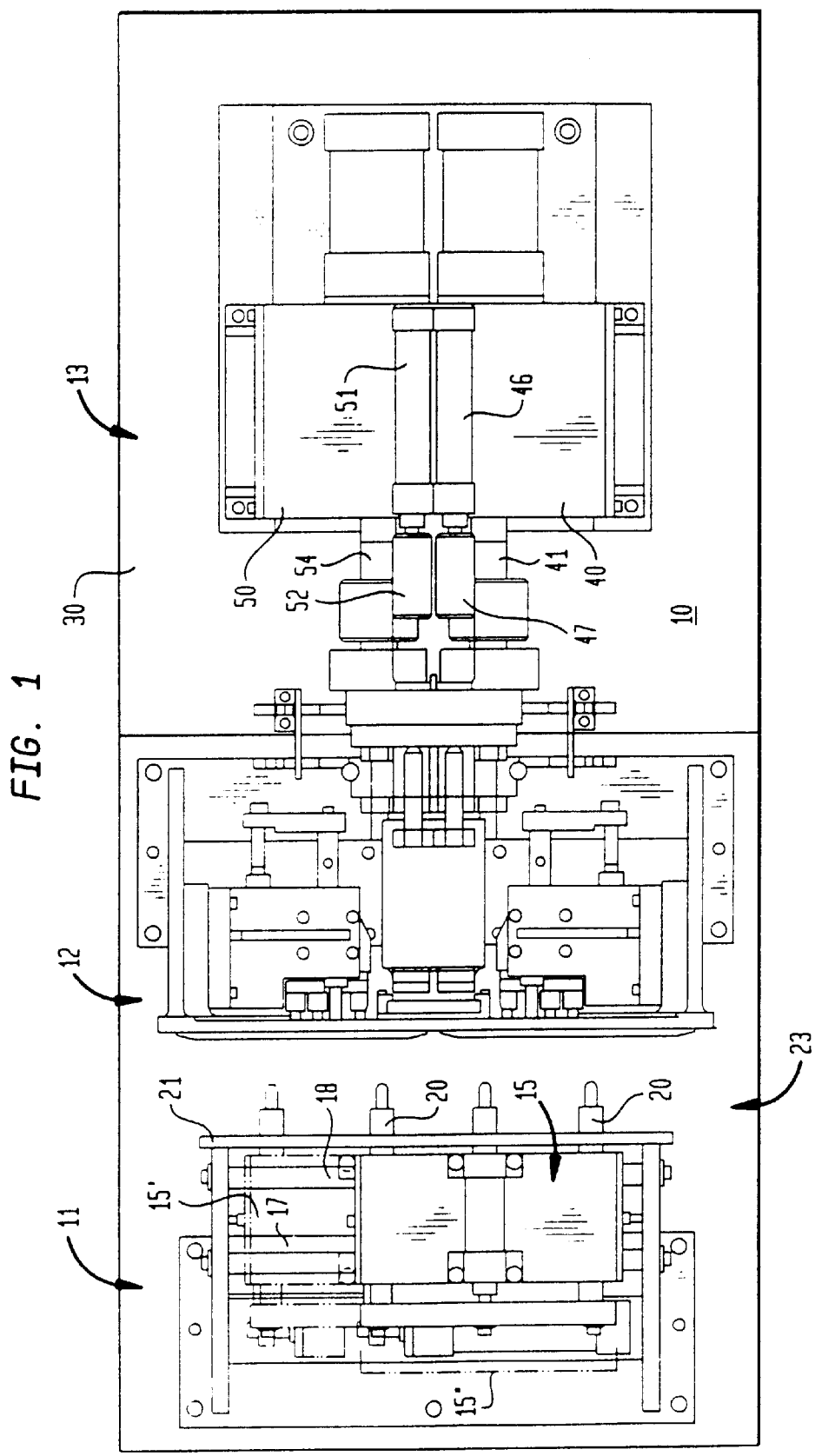
FIG. 1 is a simplified plan representation of a pressing machine for pressing a press-fit part, specifically a valve seat (not shown in this figure) that is to be pressed into a pocket of the receiving assembly (not shown in this figure), which in this specific illustrative embodiment of the invention is a cylinder head (not shown in this figure) of an internal combustion engine (not shown in this figure)

FIG. 1 is a simplified plan representation of a pressing machine 10 for pressing a press-fit part, specifically a valve seat (not shown in this figure) that is to be pressed into a pocket of a receiving assembly (not shown in this figure), which in this specific illustrative embodiment of the invention is a cylinder head (not shown in this figure) of an internal combustion engine (not shown in this figure). For purposes of this disclosure, pressing machine 10 is formed of three general sections, specifically a support and alignment section 11 for the cylinder head; a gauging section 12 that performs measurements as will be described herein; and a ram section 13 that provides the force necessary to urge the valve seat into the cylinder head.

Alignment and support section 11 is comprised of an engagement arrangement 15 that is translatable in several directions. As shown, engagement arrangement 15 is translatable transversely with respect to the major axis of pressing machine 10 along tracks 17 and 18. Thus, engagement arrangement 15 is shown displaced transversely in phantom as 15'. Similarly, the engagement arrangement can be translated in a direction parallel to the major axis of pressing machine 10, as shown by the phantom position designated 15".

Engagement arrangement 15 has coupled thereto a plurality of alignment fingers 20 that protrude from the engagement arrangement in the direction of gauging section 12. In operation, when the engagement arrangement is translated toward the left, so as to be located at phantom position 15", alignment fingers 20 are essentially retracted so as to be disposed on the left-hand side of frame portion 21. While the alignment fingers are retracted, a cylinder head (not shown in this figure) is conveyed to work region 23 so as to be disposed between alignment and support section 11 and gauging section 12. Once the cylinder head is disposed there between, engagement arrangement 15 is translated toward the right-hand side, to the position shown in the figure.

Alignment fingers 20 engauge corresponding apertures (not shown) in the cylinder head, whereby the cylinder head is maintained in a fixed alignment with respect to alignment and support section 11, as well as gauging section 12. It should be noted that, in a practical embodiment of the invention, the distance between alignment and support section 11 and gauging section 12 in work region 23 is only slightly larger than the thickness of a cylinder head, illustratively some 0.060 inch larger than the thickness of the cylinder head. Thus, very little movement of the cylinder head is permitted during the pressing operation, as will be described below.

Figure 2:
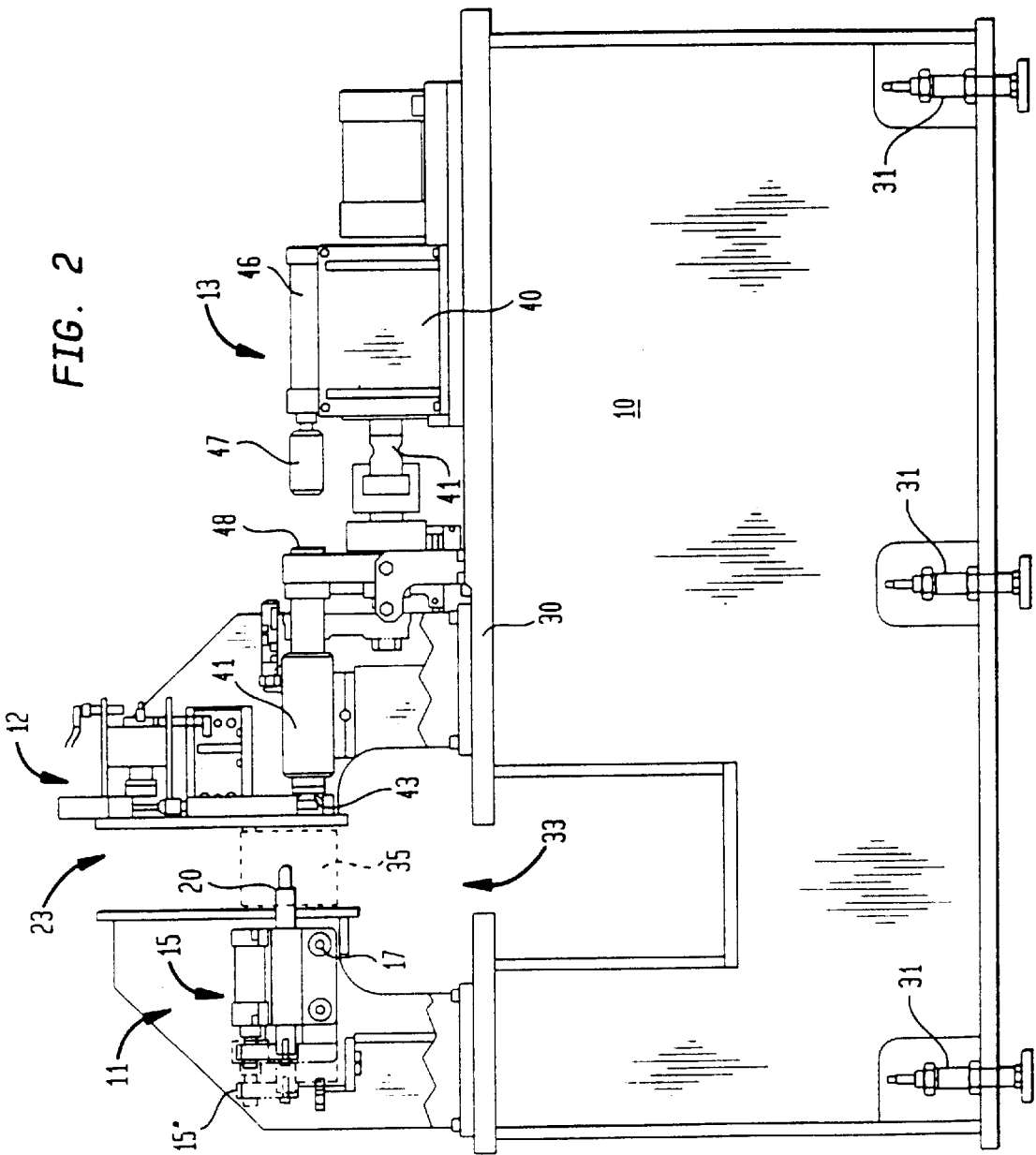
FIG. 2 is a simplified side representation of the valve seat pressing machine of FIG. 1.

FIG. 2 is simplified side representation of pressing machine 10. Elements of structure that have previously been discussed are similarly designated. Alignment and support section 11, gauging section 12, and ram section 13 are shown to be installed on a base 30 that is coupled to a floor (not specifically designated) by fasteners 31. Base 30 is arranged to have an open region 33 that will accommodate conveyance equipment (not shown) that conveys a cylinder head 35 (shown in phantom) to work region 23

Ram section 13 is shown to have an hydraulic press ram 40 that applies an axial force via piston 41 which causes a seat press section 41 to be translated toward the left-hand side of the drawing, thereby urging a valve seat 43 to be pressed into an appropriate pocket (not shown) of cylinder head 35, in a manner that will be more fully described below. In this embodiment of the invention, while seat press section 41 is applying the insertion force to the valve seat, and after a predetermined press force has been reached, the hydraulic press force is maintained while an air cylinder 46 is operated to drive a predetermined mass 47 against anvil 48 in a hammer-like fashion. Mass 47 therefore applies an impulse force having a high magnitude over a very short period of time that serves to drive the valve seat slightly further into, and preferably to the full depth of, the receiving pocket of the cylinder head. The energy applied by the impact of mass 47 against anvil 48 is essentially entirely consumed in translating the valve seat a few thousandth of an inch further into its receiving pocket, and little or no such impulse energy is delivered to the casting of cylinder head 35. This greatly improves seating of the valve seat in the receiving pocket without applying undue stress to the casting, which may have limited ability to withstand high forces in the region of the receiving pocket. As can be seen in FIG. 1, air cylinder 46 and mass 47, as well as hydraulic press ram 40 are but one of respective pairs of such devices. In this specific illustrative embodiment of the invention, air cylinder 46, mass 47, and hydraulic press ram 40 are associated with the pressing in of an exhaust valve seat, as will be described below with respect to FIG. 3. FIG. 1 shows a further hydraulic press ram 50, a further air cylinder 51, and a further mass 52 that are associate with the pressing in of an intake valve seat. Hydraulic press ram 50 exerts the axial pressing force via its associated hydraulic piston 54.

Figure 3:
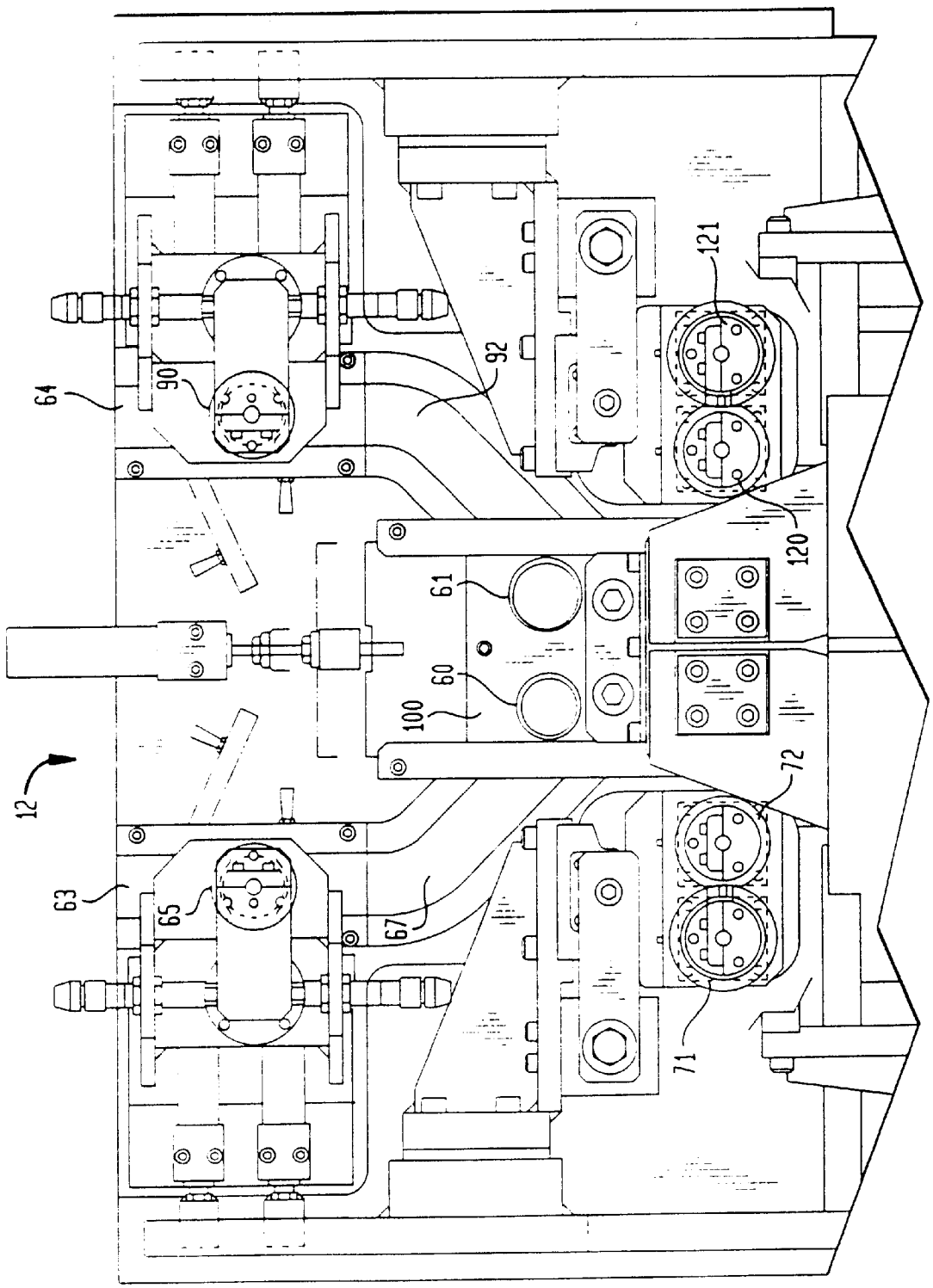
FIG. 3 is a simplified side representation of a gauging system portion of the valve seat pressing machine of FIG. 1.
Figure 4:
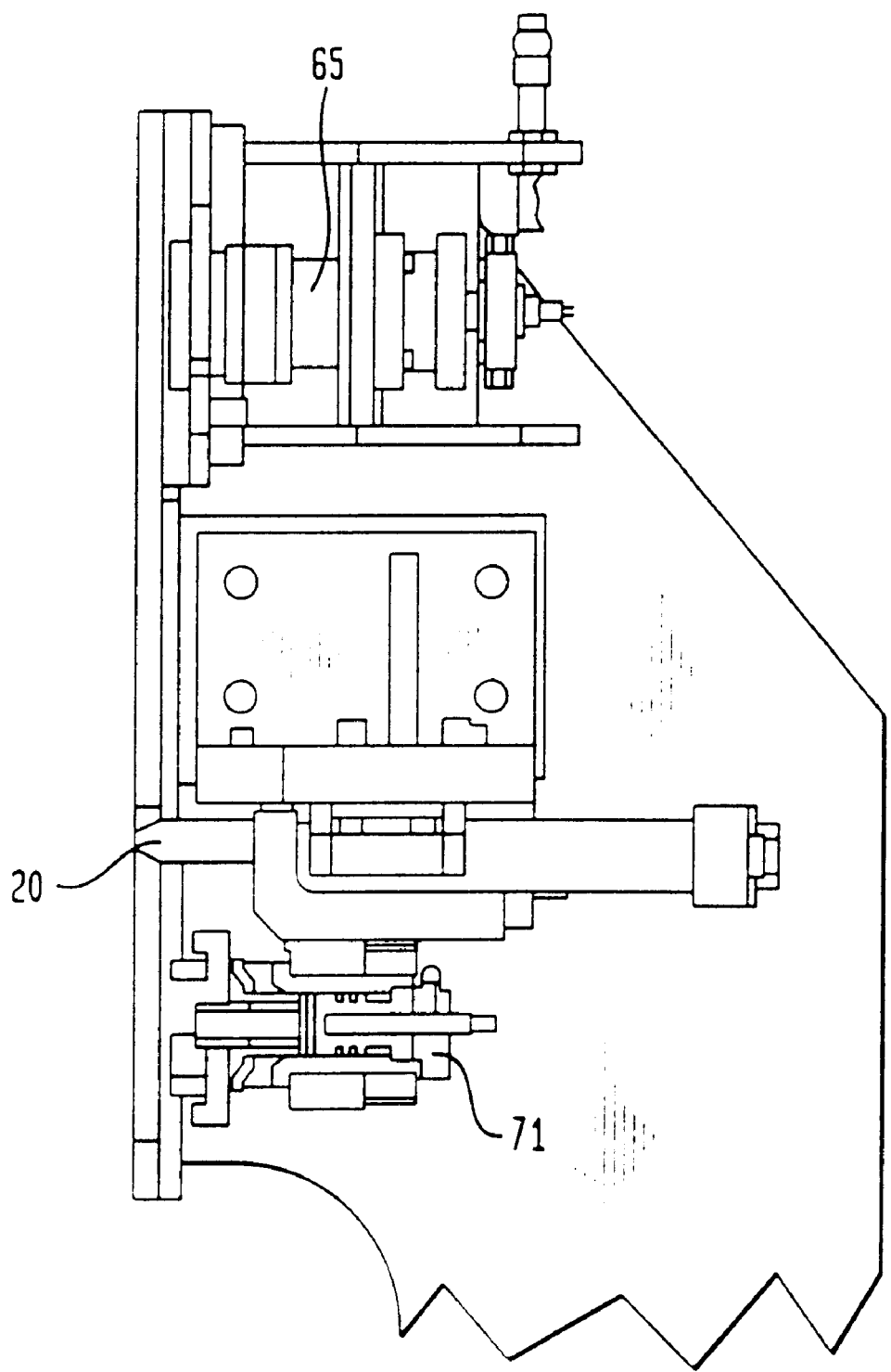
FIG. 4 is a simplified side representation of the gauging system portion of the valve seat pressing machine as represented in FIG. 3.

FIG. 3 is a simplified side representation of a gauging and valve seat delivery system portion of the pressing machine of FIG. 1, specifically gauging section 12 of FIGS. 1 and 3. FIG. 4 is a side representation of gauging section 12 of FIG. 3, as viewed from the left-hand side. Elements of structure that have previously been discussed are similarly designated. An exhaust valve seat, such as exhaust valve seat 60 is delivered to gauging section 12 via exhaust valve seat chute 63. Similarly, intake valve seats, such as intake valve seat 61, are delivered to the gauging section via an intake valve seat chute 64. Referring to the delivery of an exhaust valve seat, the exhaust valve seats are automatically delivered to exhaust valve seat chute 63 by a seat delivery system (not shown) such as that which is commercially available from Feed Matic, Inc., Sheboygan, Mich. Upon being deposited at the entrance of exhaust valve seat chute 63, the exhaust valve seat is detained at a seat gauge 65 which is shown in greater detail in FIG. 5.

Figure 5:
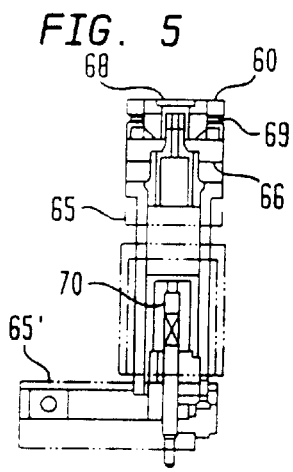
FIG. 5 is a simplified side representation of an exhaust seat gauge that is used in the embodiment of FIG. 3 to measure the thickness of an exhaust seat prior to the exhaust seat being pressed into a cylinder head (not shown in this figure)

FIG. 5 is a simplified side representation of exhaust seat gauge 65 that is used in the embodiment of FIG. 3 to measure the thickness of an exhaust seat 60 prior to the exhaust seat being pressed into a cylinder head (not shown in this figure). In FIG. 3, inner surface 67 of exhaust valve chute 63 is precision ground to form a precision planar surface on which the exhaust valve seat is placed to effect measurement with respect thereto. The seat gauge of FIG. 5 is shown to have a gauge reference 68 that is urged in the direction of the exhaust valve seat until it communicates with inner surface 67. Additionally, a seat gauge reference element 69 is urged against exhaust valve seat 60 when exhaust seat gauge 65 is moved to position 65', shown in phantom in FIG. 5, until it rests upon the exhaust valve seat. The differences in the extension distances between gauge reference 68 and seat gauge reference element 69 is converted to an electrical signal by a LVDT 70, the signal being responsive to the thickness of the exhaust valve seat. This exhaust valve seat thickness is stored as $A_e$.

Exhaust seat gauge 65 is advantageously provided with a self-alignment feature. More specifically, seat gauge reference element 69 is permitted to "wobble" in the form of transaxial angular displacement along hemispherical interface 66. In a specific illustrative embodiment of the invention, the hemispherical interface is defined by a radius that originates on the distal plane of exhaust valve seat 60. Thus, the exhaust valve seat is never permitted to be canted, or cocked, during the measurement Referring once again to FIG. 3, the depths of the exhaust and intake receiving pockets (not shown) of the cylinder head are measured by pocket gauges 71 and 72. These gauges are shown in greater detail in FIG. 6.

Figure 6:
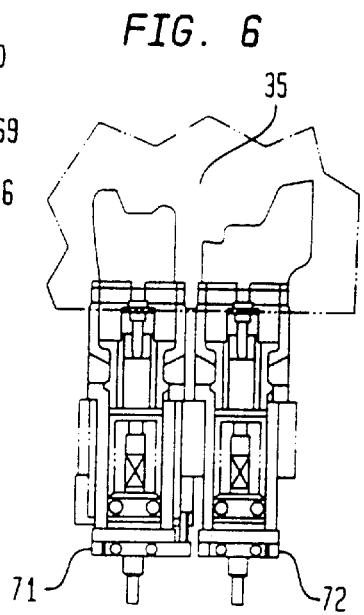
FIG. 6 is a simplified side representation of a pocket gauge assembly that is used in the embodiment of FIG. 3 to measure the depth of a pocket of the cylinder head into which the valve seats are to be pressed.

FIG. 6 is a simplified side representation of a pocket gauge assembly that is comprised of pocket gauges 71 and 72 that are used in the embodiment of FIG. 3 to measure the depth of respective exhaust ($B_e$) and intake ($B_i$) seat valve receiving pockets (not shown) of cylinder head 35, into which respective valve seats (not shown in this figure) are to be pressed. The operation of each of these pocket gauges is more clearly illustrated by reference to FIG. 9 which is a simplified enlarged side representation of a specific illustrative embodiment of the pocket gauge of FIG. 6

Figure 9:
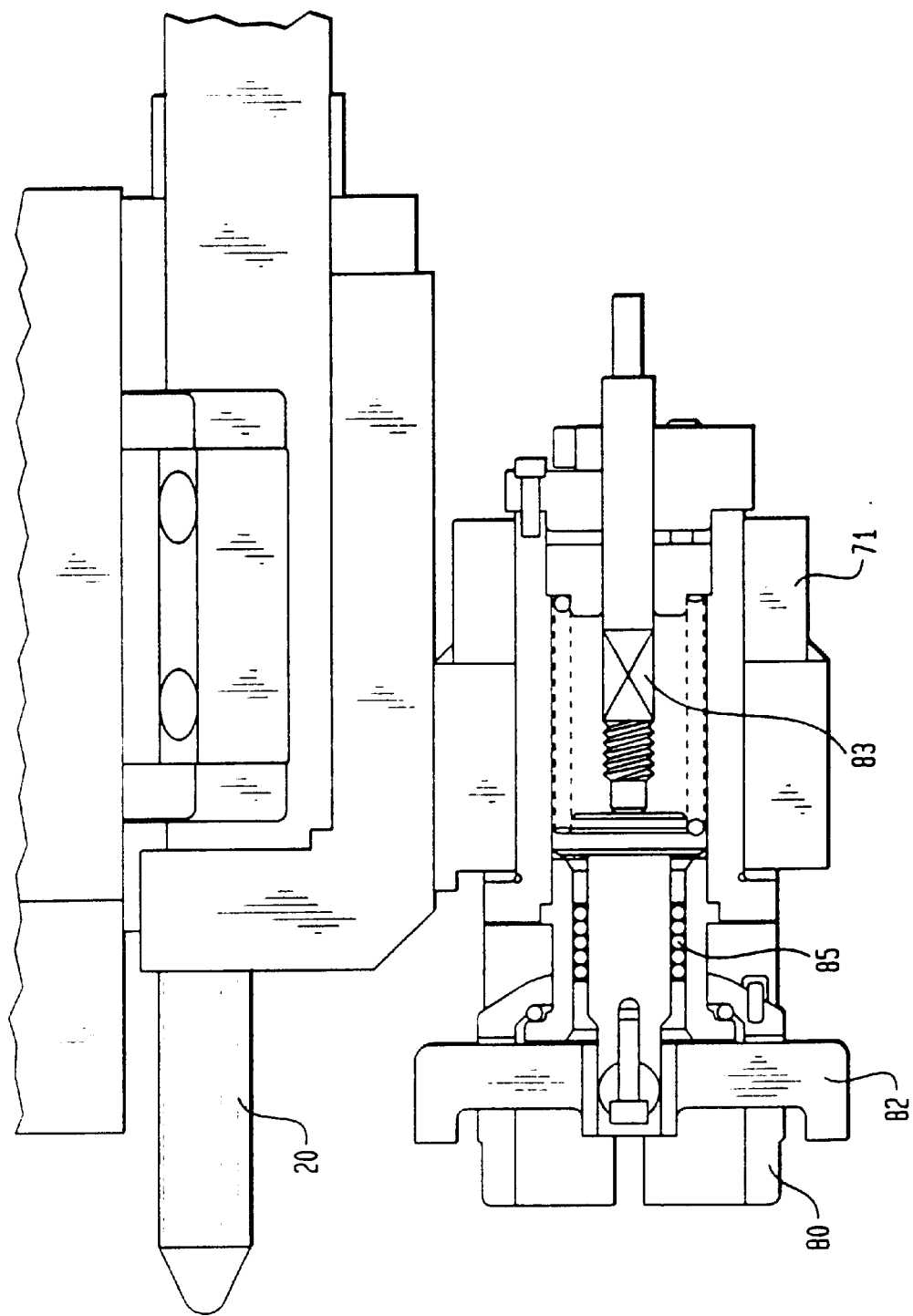
FIG. 9 is a simplified enlarged side representation of a specific illustrative embodiment of the pocket gauge of FIG. 6.

Referring for the moment to FIG. 9, pocket gauge 71 has a probe portion 80 that is urged into the receiving pocket of the cylinder head (not shown in this figure) until it is seated therein. A reference element 82 is then urged to communicate with the outer surface (not shown) of the receiving pocket. The difference in displacement of probe 80 and reference element 82 is converted to an electrical signal by a LVDT 83. Probe 80 and reference element 82 are coaxially translatable with respect to each other via a ball bearing arrangement 85, which is this specific illustrative embodiment of the invention is an interference fit bearing arrangement. This ensures that transaxial displacement between the probe and the reference element is essentially eliminated Referring once again to FIG. 6, pocket gauges 71 and 72 function essentially as described herein with respect to FIG. 4. The pocket gauges, however, are differently dimensioned from one another in view of the different diameters of the exhaust and intake valve seats, and their corresponding receiving pockets.

Referring once again to FIG. 3, an intake valve seat is delivered to intake valve seat chute 64 via commercially delivery equipment, as previously noted, and the intake valve seat is retained at intake valve seat gauge 90, in a manner similar to that hereinabove with respect to exhaust valve seat gauge 65. Thus, intake valve seat chute 64 has a ground inner surface 92 against which the received intake valve seat is placed as it is measured as previously described. Valve seat gauge 90 is shown in greater detail in FIG. 8.

Figure 8:
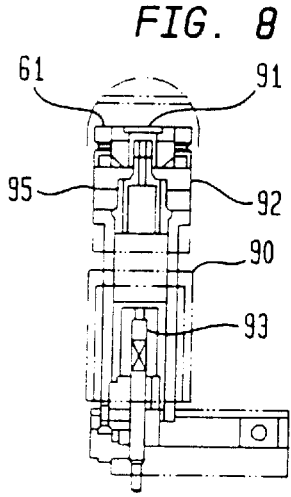
FIG. 8 is a simplified side representation of an intake seat gauge that is used in the embodiment of FIG. 3 to measure the thickness of an intake valve seat prior to the intake seat being pressed into the receiving assembly (not shown in this figure)

FIG. 8 is a simplified side representation of intake valve seat gauge 90 that is used in the embodiment of FIG. 3 to measure the thickness of an intake valve seat 61 prior to the intake valve seat being pressed into the receiving assembly (not shown in this figure). As previously described with respect to exhaust seat gauge 65 (FIG. 5), intake valve seat gauge 90 has a gauge reference portion 91 and a reference element 97, the translational difference therebetween being converted into an electrical signal responsive to the thickness of the intake valve seat by operation of a LVDT 93. Intake valve seat gauge 90, as described with respect to the exhaust seat gauge of FIG. 5 has a self-alignment feature by virtue of a semi-hemispherical engagement along hemispherical interface 95. This permits the probe and reference portions essentially to wobble to ensure alignment against a planar ground wall of the respective valve seat chute.

After the exhaust and valve seats have been measured, the valve seats are permitted to drop into a press region 100. As shown in the figure, exhaust valve seat 50 and intake valve seat 61 are disposed in the press region. After the pocket depths have been measured by pocket gauges 71 and 72, as previously described, the valve seats are pressed into their respective receiving pockets as illustrated in FIG. 10.

Figure 10:
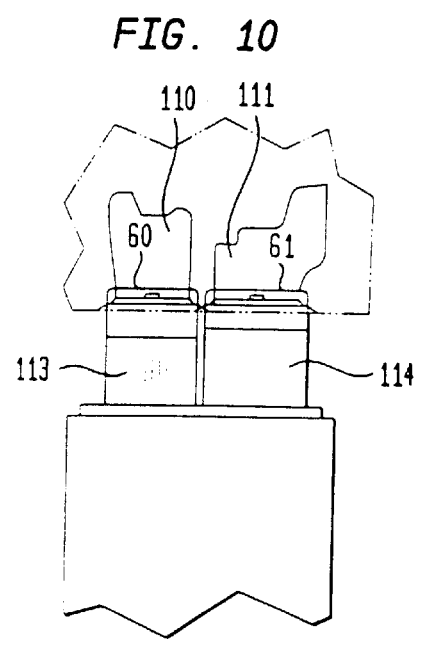
FIG. 10 is a simplified representation of a press portion the valve seat pressing machine of FIG. 1.

FIG. 10 is a simplified representation of a press portion of the valve seat pressing machine of FIG. 1. As shown, exhaust valve seat 60 and intake valve seat 61 are pressed into exhaust receiving pocket 110 and intake receiving pocket 111. Cylinder head 35 is shown in fragmented form. Ram elements 113 and 114 urge the exhaust and intake valve seats, respectively, into their respective receiving pockets. Additionally, these ram elements convey to the respective valve seats the impulse forces from masses 47 and 52 (FIG. 1, as previously described).

In some embodiments of the invention, ram elements 113 and 114 are provided with semi-hemispherical joints that permit self-aligning wobbling to assist in achieving appropriate alignment of the exhaust and intake valve seats in their respective receiving pockets. Such wobbling is in the form of transaxial angular displacement that facilitates entry of the valve seats into the respective receiving pockets. In a highly advantageous embodiment of the invention, such wobbling is effected at a radius that originates at a distal seating plane of the respective valve seats, as described hereinabove with respect to FIGS. 5 and 8. This ensures that the valve seats are never cocked so as to bind within the receiving pockets during insertion. Nevertheless, in the event such binding were to occur, excessive pressing forces would be developed, which would cause an automatic rejection of the part, since press force is monitored. After the exhaust and intake valve seats have been pressed into place, the pocket depth is measured once again to the outermost surface of the valve seats by operation of press gauges 120 and 121. These press gauges are shown in greater detail in FIG. 7.

Figure 7:
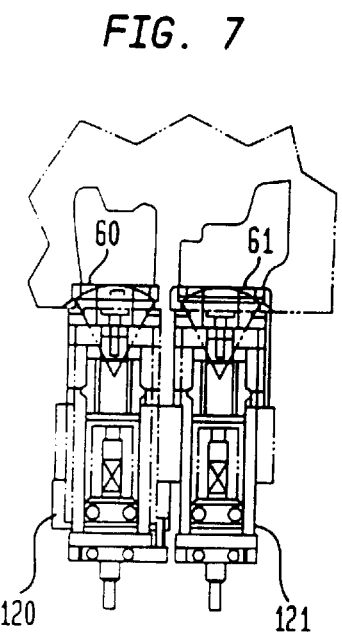
FIG. 7 is a simplified side representation of a press gauge assembly that is used in the embodiment of FIG. 3 to measure the depth of a pocket of a cylinder head after the valve seats have been pressed into their respective receiving pockets.

FIG. 7 is a simplified side representation of press gauges 120 and 121 that are used in this embodiment of the invention to measure the depth of respective receiving pockets of cylinder head 35 after the valve seats have been pressed in. Press gauges 120 and 121 operate in a manner that is similar to that of pocket gauges 71 and 72 (FIG. 6), and therefore generate respective signals that correspond to the distances between the outermost surfaces of the exhaust ($C_e$) and intake ($C_i$) valve seats of the outer surface of the receiving pocket. At this time, all of the measurement signal values will have been stored, specifically:

1. the thickness of the exhaust valve seat $A_e$;
2. the thickness of the intake valve seat $A_i$;
3. the depth of the exhaust valve seat receiving pocket $B_e$;
4. the depth of the intake valve seat receiving pocket $B_i$;
5. the residual depth of the exhaust valve seat pocket after the exhaust valve seat has been pressed in $C_e$; and
6. the residual depth of the intake valve seat pocket after the intake valve seat has been pressed in $C_i$.

Computations are then made to establish whether the residual depths are within predetermined tolerances of the differences between the respective pocket depths and the respective valve seat thicknesses, as follows:

$$B_e - A_e = C_e, \text{ and}$$
$$B_i - A_i = C_i$$

Parts that are outside of the predetermined specifications are rejected. Such failure to meet specified tolerances may result from a variety of causes, such as improper valve seat thickness, improper pocket depth, and inadequate seating depth of the valve seat. Of course, excessive seating depth of the valve seat could be an indicator of catastrophic damage to the receiving assembly.

Figure 11:
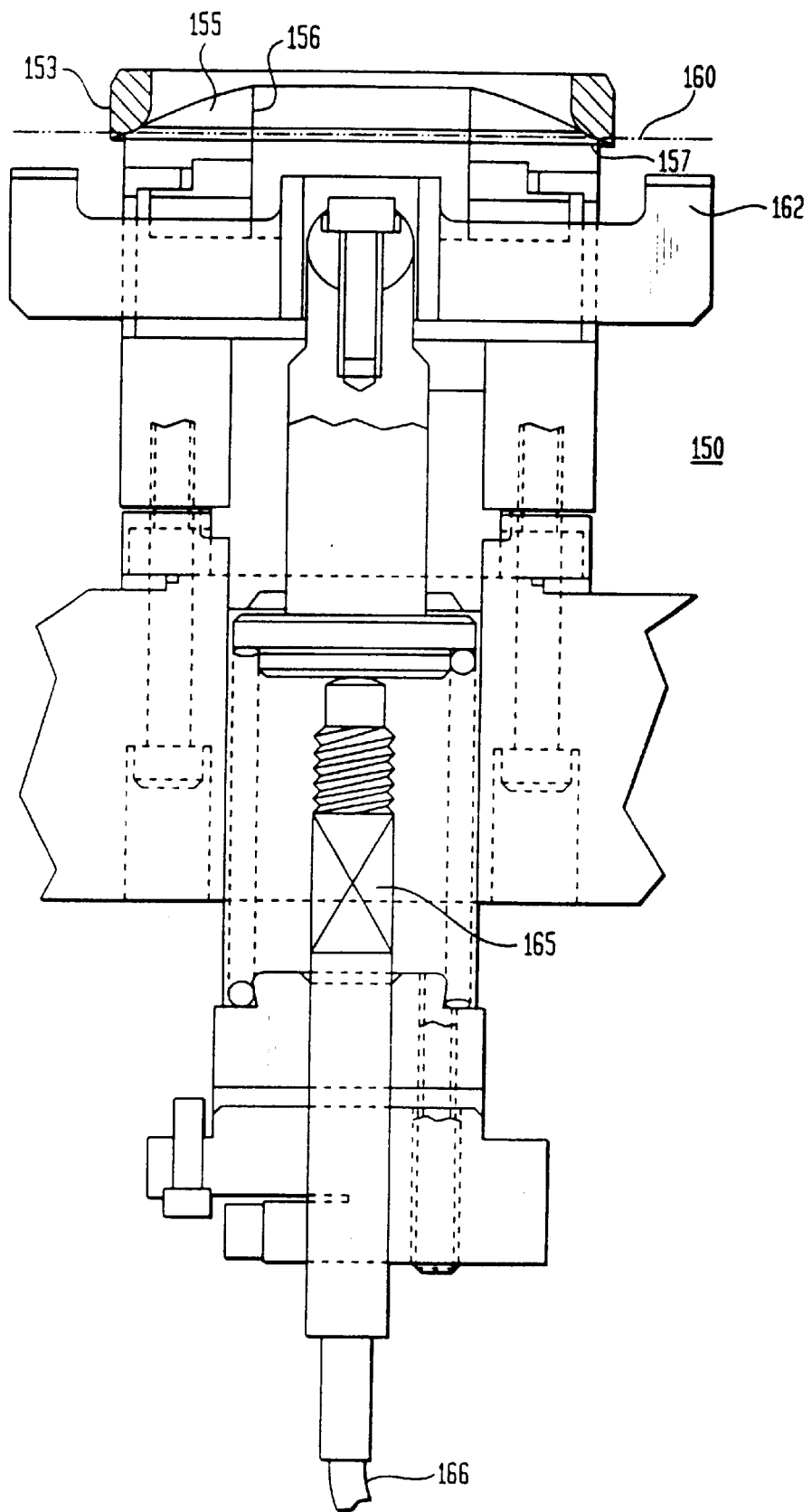
FIG. 11 is a simplified representation of an alternative embodiment of press gauge assembly that is used in the embodiment of FIG. 3 to measure the depth of a pocket of a cylinder head after the valve seat have been pressed into the receiving pocket.

FIG. 11 is a simplified representation of an alternative embodiment of press gauge assembly 150 that is used in the embodiment of FIG. 3 to measure the depth of a pocket of a cylinder head (not shown) after a valve seat 153 (shown cross-sectionally) has been pressed into the receiving pocket (not shown). Press gauge assembly 150 is provided with a gauge head 155 that has a central hemispherical portion 156 is accommodated, as shown, at least partially within the central contour of valve seat 153. This ensures that the gauge head is centered on the valve seat.

A peripheral portion 157 of gauge head 155 communicates with the proximal edge of valve seat 153. The interface between peripheral portion 157 of gauge head 155 and the proximal edge of valve seat 153 is represented by gauge line 160. The extent to which gauge head 155 is required to travel into the receiving pocket to communicate with the proximal edge of valve seat 153 is measured against a reference portion 162 which, in the practice of the present seat valve installation embodiment of the invention, would communicate with the surface of the cylinder head (not shown in this figure). An electrical signal that corresponds to the translational difference between reference portion 162 and gauge head 155 is produced, in this specific illustrative embodiment of the invention, by a transformer 165 at electrical leads 166. Transformer 165 is of the linear variable differential transformer (LVDT) type, previously discussed.

Although the invention has been described in terms of specific embodiments and applications, persons skilled in the art can, in light of this teaching, generate additional embodiments without exceeding the scope or departing from the spirit of the claimed invention. Accordingly, it is to be understood that the drawing and description in this disclosure are proffered to facilitate comprehension of the invention, and should not be construed to limit the scope thereof.

What is claimed is:

1. An arrangement for pressing a press-fit part into a receiving portion of a receiving assembly, the arrangement comprising:
   a first measuring arrangement for measuring a predetermined dimension of the press-fit part;
   a first probe for communicating with an inner surface of the receiving portion of the receiving assembly;
   a second probe for communicating with an outer surface of the receiving portion of the receiving assembly;
   a differential measurement arrangement for producing a first electrical measurement signal responsive to a difference in the displacements of said first and second probes;
   a press drive for urging the press-fit part onto the receiving portion of the receiving assembly; and
   an impulse drive for applying an impetus of short duration to the press-fit part.

2. The arrangement of claim 1, wherein the receiving portion of the receiving assembly onto which the press-fit part is to be pressed is a pocket of the receiving assembly, and there is further provided a holding arrangement for holding the press-fit part in position to be urged into the pocket of the receiving assembly by said press drive.

3. The arrangement of claim 1, wherein there is further provided a force measuring arrangement for measuring an insertion force applied to the press-fit part by said press drive.

4. The arrangement of claim 1, wherein there is further provided a bearing interposed between said first and second probes.

5. The arrangement of claim 4, wherein said bearing comprises an interference fit ball bearing arrangement interposed between said first and second probes.

6. The arrangement of claim 1, wherein said first probe is arranged to communicate with the inner surface of the pocket of the receiving assembly at a plurality of locations thereon.

7. The arrangement of claim 1, wherein said second probe is arranged to communicate with the outer surface of the pocket of the receiving assembly at a plurality of locations thereon.

8. The arrangement of claim 1, wherein there is further provided an angular displacement arrangement coupled to said first probe, wherein said first probe is arranged to be angularly displaceable with respect to an axis of translation thereof directed toward said pocket of the receiving assembly and substantially self-aligning with respect thereto.

9. The arrangement of claim 1, wherein said first and second probes are arranged to be axially parallel with respect to each other.

10. The arrangement of claim 1, wherein said press drive is provided with an angular displacement drive arrangement for communicating with said press-fit part and rendering said press fit part to be angularly displaceable with respect to an axis of translation of said press fit part directed toward said pocket of the receiving assembly and substantially self-aligning with respect to said pocket of the receiving assembly.

11. The arrangement of claim 10, wherein the angular displacement of said press drive is responsive to a radius that originates at a distal seating plane of the press-fit part.

12. An arrangement for pressing a press-fit part into a receiving portion of a receiving assembly, the arrangement comprising:
   a first measuring arrangement for measuring a predetermined dimension of the press-fit part;
   a second measuring arrangement for measuring the receiving portion of the receiving assembly;
   a press drive for urging the press-fit part onto the receiving portion of the receiving assembly;
   an impulse drive for applying an impetus of short duration to the press-fit part; and
   an angular displacement drive arrangement for communicating with said press-fit part and rendering said press fit part to be angularly displaceable with respect to an axis of translation of said press fit part directed toward the receiving portion of the receiving assembly and substantially self-aligning with respect to the receiving portion of the receiving assembly.

13. The arrangement of claim 12, wherein the angular displacement of said press drive is responsive to a radius that originates at a distal seating plane of the press-fit part.

14. The arrangement of claim 12, wherein said second measuring arrangement comprises:
   a first probe for communicating with an inner surface of the pocket of the receiving assembly;
   a second probe for communicating with an outer surface of the pocket of the receiving assembly; and
   a differential measurement arrangement for producing a first electrical measurement signal responsive to a difference in the displacements of said first and second probes.

15. The arrangement of claim 12, wherein the receiving portion of the receiving assembly onto which the press-fit part is to be pressed is a pocket of the receiving assembly, and there is further provided a holding arrangement for holding the press-fit part in position to be urged into the pocket of the receiving assembly by said press drive.

* * * * *